United States Patent Office 3,787,418
Patented Jan. 22, 1974

3,787,418
6-ALKYL-3-METHYLQUINALDINIC ACIDS
Michael Pang, Stamford, Conn., assignor to American Cyanamid Company, Stamford, Conn.
No Drawing. Original application Feb. 17, 1971, Ser. No. 116,065, now Patent No. 3,697,400. Divided and this application Apr. 5, 1972, Ser. No. 241,477
Int. Cl. C07d 33/48
U.S. Cl. 260—287 R                 3 Claims

ABSTRACT OF THE DISCLOSURE

New 6-alkyl-3-methylquinaldinic acids and methods of synthesis are disclosed, which acids are useful in extracting copper from acidic leach solutions.

New quinaldinic acids and methods of synthesis are disclosed.

CROSS-REFERENCES

This is a divisional of application Ser. No. 116,065, filed Feb. 17, 1971, now U.S. Pat. 3,697,400, Oct. 10, 1972, entitled "Recovering Metals by Extraction with a Quinaldinic Acid and Electrowinning From the Stripped Chelate."

BRIEF SUMMARY

This invention relates to long chain alkyl-3-methylquinaldinic acids, and to methods of making such acids.

Advantageously, the present long chain alkyl-3-methylquinaldinic acids may be used in solvent extraction of copper, as set forth in parent Pat. 3,697,400, supra, hereby incorporated by this reference thereto.

Quinaldinic acids have been described; for instance Majumdar, Quinaldinic Acid as a Reagent for the Separation and Determination of Copper and Cadmium, Analyst, 64, 874 to 876 (1939), shows quinaldinic acid as an analytical reagent. Pertinent references are cited.

Popp, Reissert Compound, Advances in Heterocyclic Chemistry, vol. 9, Academic Press, New York (1968), is a review article with 63 references, mentioning among other methods, certain syntheses of quinaldinic type compounds.

One of the classic reactions for organic chemistry is the Skraup synthesis in which aniline is heated with glycerol and nitrobenzene in the presence of sulfuric acid to yield quinoline.

To prepare the extractants of this invention, substituted anilines in which there are one or more alkyl groups in the 3, 4, or 5 positions are reacted under similar conditions to yield substituted quinolines.

Instead of glycerol, methacrolein, also called α-methacrolein or 2-methylpropenal,

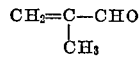

or its diacetate, methallylidene diacetate

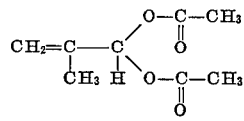

which under these conditions behaves as the aldehyde, is used, and a 3-methyl quinoline is obtained.

Depending upon the size of the vessel, heat may be generated so vigorously that external cooling is required to maintain the temperature at that desired, or in other conditions the heat losses from the equipment will be such that heat must be added.

Conveniently the acid is put in the reactor and a mixture of the substituted aniline, methacrolein or methalkylidene diacetate and nitrobenzene added thereto with stirring. The vigor of the reaction depends in part upon the substituents on the aniline and may occur from near room temperature to around 135° C. Frequently it is convenient to add the reactants at below 100° C. preferably around 60° to 90° C. and then heat to between 120° and 140° C. to complete the reaction. After the reaction, the residual nitrobenzene is removed as for example by steam distillation, additional water added and the aqueous layer discarded. The organic product may be washed with caustic to neutralize any residual acid.

The conditions described are unique to the preparation of long chain alkyl-3-methylquinolines. In the original Skraup synthesis, concentrated sulfuric acid (96%) is added slowly to a mixture of aniline, nitrobenzene, glycerol, boric acid and ferrous sulfate. When this procedure is employed with long chain alkyl anilines, the reaction mixture gels during the sulfuric acid addition. This gelation presents mechanical stirring problems and may result in a hazardous condition, particularly in large scale operation, in which it is difficult to control the highly exothermic Skraup reaction. These difficulties are prevented by reversing the order of addition and by using 80–85% sulfuric acid, preferably about 82%. These conditions avoid gel formation. The synthesis can be carried out smoothly by adding alkyl aniline, and then a mixture of nitrobenzene, methacrolein or methalkylidene diacetate to 82% sulfuric acid.

The alkyl-3-methylquinoline is dissolved in a solvent such as methylene chloride or other inert solvent and stirred with an aqueous solution of sodium or potassium cyanide. To the stirred mixture is added benzoyl chloride. This is a classic Reissert reaction. The cyanide adds to the 2 position while the benzoyl group adds to the nitrogen. The benzoyl group subsequently splits out as benzaldehyde After this reaction is completed, the reactor may be cooled, the mixture stirred with water and the aqueous layer separated and discarded. To the organic layer is then added concentrated hydrochloric acid slowly at about room temperature, followed by heating to 75–90° C. for 1–4 hours to effect hydrolysis of the nitrile to a carboxylic acid group. The product alkyl-3-methylquinaldinic acid can be separated by distilling off the benzaldehyde by steam distillation, discarding the aqueous layer, dissolving the thus formed quinaldinic acid in a solvent such as hexane, washing with caustic, then acid, and then water to obtain the said quinaldinic acid.

The product alkyl-3-methylquinaldinic acid can also be conveniently isolated by steam distilling the hydrochloric acid-organic layer which effects the hydrolysis reaction and the removal of benzaldehyde simultaneously. This one-step process has the additional advantage over the two-step heating-distilling process of minimizing the formation of by-product benzoin.

The sum totals of the carbons in the 3, 4, and 5 positions of the aniline should be betwen about 6 and about 30. The alkyl groups can be branched and but for cost considerations could have substituents such as chlorine or alkoxy groups thereon. Any groups which do not impair the oil solubility and are inert under the conditions of extraction of copper are acceptable but from cost considerations it is usual to have only the 6 to 30 carbon alkyl substituents.

The reactions may be illustrated by the following equations:

(1)

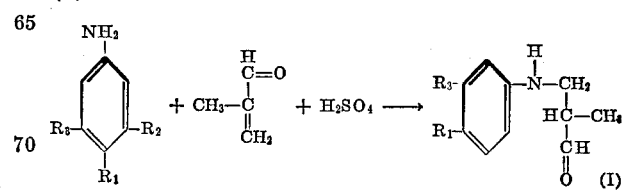

(2) then,

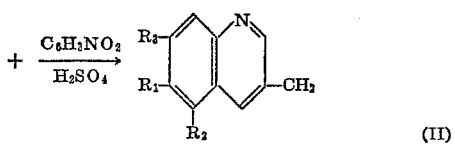

(3) then,

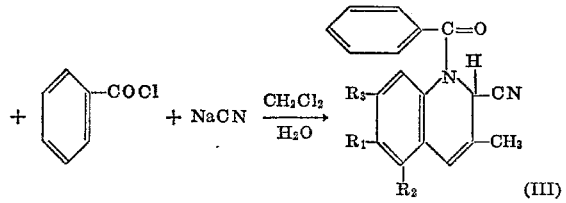

(4) then,

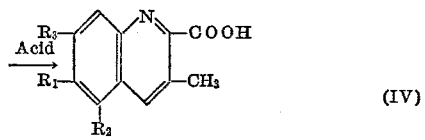

As is obvious, the long chain alkyl-3-methylquinaldinic acid can be a mixture of alkyl-3-methylquinaldinic acids. A convenient starting material for commercial syntheses is a technical or crude grade of p-dodecylaniline. As commercially available this material has a plurality of different alkyl groups in the para position ranging from about 6 to 18 with an average of about 12. Some of the commercial grades have at least 50% of dodecylaniline in the technical grade. A pure compound, or a mixture of pure compounds may be used, but as cost considerations in copper refining are extremely important, the lower cost technical grades are normally used and are a mixture of various p-alkyl anilines. The chelating ability is a molar function and hence the larger the alkyl groups, the lower the chelating capacity per pound of the long chain quinaldinic acids; on the other hand the introduction of additional alkyl groups appears to aid solubility in the oil phases. An effective compromise occurs at about the p-dodecyl quinaldinic acid and hence, because of this and the commercially availability of the technical grade p-dodecyl aniline as a starting material, such material is usually the starting material of choice.

By way of illustration but not limitation, the invention is set forth in the following examples in which all parts are by weight and temperatures centigrade unless clearly otherwise stated:

EXAMPLE 1

Preparation of 6-dodecyl-3-methylquinoline

Mix 106 g. (1.1 mole) of concentrated HCl (12.3 N) with efficient mechanical stirrer, thermometer, addition funnel and a thermometer. Add 130.7 g. (0.5 mole) of p-dodecylaniline slowly. Agitate rapidly and when the reaction mixture turns opaque, charge 10 g. (0.081 mole) of nitrobenzene. Raise the reaction temperature to about 80° C. Feed in carefully a mixture of 52.5 g. (0.75 mole) of methacrolein and 51.5 g. (0.419 mole) of nitrobenzene at a rate such that the reaction temperature rises to and remains at 100–105° C. After about ⅔ of the mixture is added, charge 1 g. of $FeSO_4 \cdot 7H_2O$. After the addition, maintain the reaction for 2 hours at about 100° C. Reverse and incline the condenser and pass steam into the reaction mixture until the distillate is free from nitrobenzene; then transfer the reaction mixture into a separatory funnel. Drain off and discard the lower aqueous layer. Wash with 400 ml. of 10% sodium hydroxide and then with two 100 ml. aliquots of hot water. Add 100 ml. of ether and dry the ethereal solution with 50 g. of anhydrous sodium sulfate. Remove the ether by means of vacuum. A yield of 156 g. of crude product is obtained. Vacuum distillation gives 106 g. of purified 6-dodecyl-3-methylquinoline.

EXAMPLE 2

Preparation of 6-dodecyl-3-methylquinoline

Dilute 183.5 g. (1.8 moles) of concentrated $H_2SO_4$ with 24.5 g. of water in a 500 ml. reactor equipped with a mechanical stirrer, thermometer, addition funnel and condenser. Add 130.7 g. (0.5 mole) of p-dodecylaniline slowly. Then add 36.9 g. (0.3 mole) of nitrobenzene and 2.5 g. of $FeSO_4 \cdot 7H_2O$. Adjust the reaction mixture to 70° C. and slowly add 52.5 g. (0.75 mole) of methacrolein. After 13 g. of methacrolein is added, raise the reaction temperature to 90° C. by an external steam bath. Carefully add the remainder of the methacrolein at a rate such that the reaction temperature remains about at 100° C. The addition of methacrolein may take about 30 minutes. Allow the reaction mixture to stand overnight at ambient room temperature. Rearrange the condenser and steam distill out all of the unreacted nitrobenzene. The steam distillation takes about four hours. Transfer the reaction mixture to a separatory funnel, drain and discard the lower aqueous layer. Add about 400 ml. of ether and then wash thoroughly with 300 ml. of 13% caustic, then wash four times with 300 ml. aliquots each of 5% caustic. Dry the ethereal solution with about 50 g. of anhydrous $Na_2SO_4$, filter and allow the filtrate to evaporate in vacuo to remove the ether. The crude 6-dodecyl-3-methylquinoline (154 g.) is distilled in vacuum. Eighty-six grams of distilled product are obtained.

EXAMPLE 3

Preparation of 6-dodecyl-3-methylquinoline

Dilute 106 g. (1.1 moles) of concentrated HCl with 24 ml. of water in a 1 liter reactor. Agitate vigorously while adding 130.7 g. (0.5 mole) of p-dodecylaniline. Charge 24 g. (0.195 mole) of nitrobenzene, 2.5 g. of $FeSO_4 \cdot 7H_2O$ and 0.1 g. of $CuSO_4 \cdot 5H_2O$. Mix thoroughly and then add 38.5 g. (0.5 mole) of methacrolein. Maintain the reaction temperature at 40° C. during the addition of methacrolein. Then raise the temperature of 60° C. Add 47 g. (0.382 mole) of nitrobenzene. After the addition raise the reaction temperature to 100° C. and allow to react for 2 hours. Rearrange the reflux condenser and steam distill out all unreacted nitrobenzene. Transfer the mixture to a separatory funnel, and drain and discard the lower aqueous layer. Mix in 200 ml. of benzene and 100 ml. of ether. Wash with 200 ml. of 20% caustic. Wash twice with 200 ml. aliquots each of water. Stir the product with 100 g. of anhydrous $Na_2SO_4$ and 2 g. of decolorizing carbon and then filter. The filtrate is vacuum stripped to remove solvents. The crude product obtained (138 g.) is vacuum distilled to yield 70 g. of pure 6-dodecyl-3-methylquinoline.

EXAMPLE 4

Preparation of 6-dodecyl-3-methylquinoline

In a 2 liter reactor, dilute 276 g. (2.7 moles) of concentrated sulfuric acid with 47 g. of water. While stirring vigorously, add 195.5 g. (0.75 mole) of p-dodecylaniline and follow by 10 g. (0.081 mole) of nitrobenzene, all at about 40–80° C. Raise the temperature to about 100° C. and add a mixture consisting of 45 g. (0.366 mole) of nitrobenzene and 146 g. (0.85 mole) of methallylidene diacetate. Add slowly to avoid a sudden increase of temperature because of the exothermic reaction. 184 g. of concentrated $H_2SO_4$ and 30 ml. of water is mixed and added. After the complete removal of unreacted nitrobenzene by steam distillation, the product is suction filtered through course fritted glass. The bottom aqueous layer is discarded. The top oily layer is then washed once with 500 ml. of 10% sodium hydroxide and twice with 400 ml. aliquots of water. A yield of 228 g. of crude 6-dodecyl-3-methylquinoline is isolated.

EXAMPLE 5

Preparation of 6-dodecyl-3-methylquinaldinic acid

Mix 31.15 g. (0.1 mole) of 6-dodecyl-3-methylquinoline with 75 ml. of methylene chloride, and 9.1 g. (0.140 mole) of potassium cyanide in 12 ml. of water in a 500 ml. reactor. Stir the mixture vigorously, and then add a solution containing 25.2 g. (0.179 mole) of benzoyl chloride in 25 ml. of methylene chloride slowly such that the exothermic reaction proceeds at 30° C. without cooling. After the addition continue the reaction for another two hours at 45° C. Add 75 ml. of concentrated HCl and steam distill the mixture until free from benzaldehyde. Remove the aqueous layer and add 50 ml. of 20% caustic. Repeat the steam distillation. Reacidify the above mixture with dilute HCl. Crude 6-dodecyl-3-methylquinaldinic acid (33.2 g.) is then isolated as an amorphous solid.

EXAMPLE 6

Preparation of AMQA

Mix 40 g. (0.128 mole) of 6-dodecyl-3-methylquinoline with 50 ml. of petroleum ether in a reactor. Dissolve 16.3 g. (0.25 mole) of potassium cyanide with 33 ml. of water and charge to the reactor. With vigorous stirring add a solution consisting of 35 g. (0.25 mole) of benzoyl chloride and 35 ml. of petroleum ether. Add at such a rate that the reaction temperature is about 34° C. without external heating. Raise the reaction temperature to 40° C. and stir for 15 minutes. Wash the reaction mixture with 150 ml. of water, and discard the aqueous layer. Add 75 ml. of concentrated HCl and steam distill until the distillate is free from benzaldehyde. The organic fraction of the residue is separated and washed with two 100 ml. aliquots of 10% sodium hydroxide, then with two 100 ml. aliquots of water. A white suspension is formed which is separated out by centrifugation. Wash the solid once with 40 ml. of hexane. Dissolve the solid in 50 ml. of ethanol and then pour into 200 ml. of acidified water. Extract the mixture with n-hexane. Evaporation of n-hexane yields 27.5 g. of 6-dodecyl-3-methylquinaldinic acid.

EXAMPLE 7

Preparation of AMQA

Dissolve 15.58 g. (0.05 mole) of 6-dodecyl-3-methylquinoline in 35 ml. of methylene chloride in a 250 ml. reactor. Add a solution of 6.51 g. (0.1 mole) of potassium cyanide in 6.5 ml. of water. Stir rapidly and add 14.06 g. (0.1 mole) of benzoyl chloride dropwise. Stir for two hours at ambient room temperature. Add 40 ml. of concentrated HCl and steam distill until the distillate is free from benzaldehyde. Extract the residue with 250 g. of hexane. Wash the hexane twice with water. 16.2 g. of 6-dodecyl-3-methylquinaldinic acid is isolated by vacuum evaporation of the hexane.

EXAMPLE 8

Synthesis of 6-dodecyl-3-methylquinaldinic acid

Dilute 159 g. of concentrated HCl with 36 ml. of water in a 3 liter reactor. Stir rapidly and add 195 g. (0.75 mole) of p-dodecylaniline slowly. The reaction temperature increases owing to the exothermic reaction. When the mixture turns white or light yellow, add 15 g. (0.122 mole) of nitrobenzene. Raise the reaction temperature to 90° and then add a mixture consisting of 40 g. (0.325 mole) of nitrobenzene and 78 g. (1.12 moles) of freshly distilled methacrolein. Schedule the addition rate so that the reaction temperature is 96–100°. The addition takes about 1 hour. Allow the reaction to run for another one hour at 100°. Rearrange the condenser and steam distill the reaction mixture until the distillate is free from nitrobenzene. Transfer the residue into a separatory funnel and drain off the lower layer. Wash the viscous organic layer thoroughly with 400 ml. of 10% caustic. Drain and discard the caustic wash. If the wash becomes acidic to litmus, repeat the wash. Dissolve the viscous residue with 200 ml. of ether and then wash twice with 200 ml. aliquots each of water. Dry the ethereal solution with 100 g. of anhydrous $Na_2SO_4$. Filter and then evaporate the ether under reduced pressure. A dark and viscous product (235 g.) is isolated (theor. 234 g.). Vacuum distillation (150–190° at 0.1 mm.) with 0.5 g. of zinc dust gives 165 g. of viscous light yellow liquid (70.5% yield based on p-dodecylaniline) which is the 6-dodecyl-3-methylquinoline. Mix 155.7 g. (0.5 mole) of said 6-dodecyl-3-methylquinoline with 150 ml. of methylene chloride. Dissolve 48.7 g. (0.75 mole) of potassium cyanide in 50 ml. of water and then mix thoroughly with above. Stir the resultant mixture at moderate speed. Add, slowly, to the above a mixture of 105 g. (0.75 mole) of benzoyl chloride and 25 ml. of methylene chloride through an addition funnel. Schedule the addition rate so that the reaction temperature is about 45°. The addition takes 45 minutes. Stir the reaction at ambient temperature for another 45 minutes. Transfer all of the liquid mixture into a separatory funnel and discard the upper aqueous layer. Mix the methylene chloride layer with 150 ml. of concentrated HCl and steam distill until the distillate is free of benzaldehyde. Dissolve the organic residue with 400 ml. of ether and wash three times with 200 ml. aliquots of 10% caustic. Evaporate the ether and redissolve the solid residue with 800 ml. of 90% methanol. Wash seven times with 100 ml. aliquots each of n-heptane. Add dilute HCl until the methanolic solution is acidic to litmus. Pour the methanolic solutin into 2 liters of water to effect separation of an oily product. Extract the product with two 200 ml. portions of ether. Vacuum evaporation of ether from the extract yields 84.4 g. (53% based on 6-dodecyl-3-methylquinoline) of 6-dodecyl-3-methylquinaldinic acid.

I claim:

1. A substituted quinaldinic acid of the formula

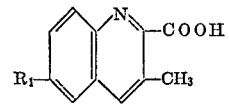

where $R_1$ is an alkyl group, of at least 6, and not greater than 30 carbon atoms.

2. The quinaldinic acid of claim 1 in which $R_1$ has from 6 to 20 carbon atoms.

3. The quinaldinic acid of claim 1 which is 6-dodecyl-3-methylquinaldinic acid.

References Cited

UNITED STATES PATENTS

| | | | |
|---|---|---|---|
| 2,363,778 | 11/1944 | Pederson | 260—287 R |
| 2,372,588 | 3/1948 | Larsen | 260—287 R |
| 3,637,476 | 1/1972 | Pang | 260—287 R |

OTHER REFERENCES

Fuson et al., Organic Chemistry, Wiley (1942), p. 86.

DONALD G. DAUS, Primary Examiner

U.S. Cl. X.R.

260—270 R, 283 SY, 283 CN